Patented Mar. 14, 1944

2,344,208

UNITED STATES PATENT OFFICE

2,344,208

PROCESS FOR REGENERATING A "SPENT" NOBLE METAL OXIDE HYDROGENATION CATALYST

William J. Kirkpatrick, Marshallton, Del., assignor to Hercules Powder Company, Wilmington, Del., a corporation of Delaware No Drawing. Application March 26, 1941, Serial No. 385,305

12 Claims. (Cl. 252—238)

This invention relates to a process of regeneration of a supported noble metal oxide hydrogenation catalyst. More particularly, it relates to a process of regeneration of a supported platinum oxide hydrogenation catalyst.

The most important factor deterring the use of noble metal oxide catalysts in the hydrogenation of many materials is that of the loss occurring during the making of the catalyst and during the hydrogenation process. Noble metal loss becomes particularly acute in the case of supported noble metal oxide catalysts. Where such a catalyst is used, the added problem of separating the noble metal from the support is encountered. With the supports of the prior art, such as, for example, diatomaceous earth, silica gel, pumice, carbon, etc., it has been found impossible to accomplish substantially complete removal of noble metal by a simple process, such as, for example, dissolution of the noble metal or its compound in a suitable solvent even at an elevated temperature. Actual tests have shown that platinum oxide catalysts, prepared by the fusion of a platinum compound with sodium nitrate and deposited on the above-named supports, retain up to 10% and sometimes more of the platinum even after prolonged treatment of the spent support with aqua regia at reflux temperature. The platinum is evidently combined with the support in some way, and it defies removal by any such simple process. To finally obtain the remainder of the platinum, it is necessary to smelt the support. The smelting operation is, of course, a complicated and expensive one.

The prior art methods employed in connection with supported noble metal oxide catalysts have required the making of entirely new catalysts when the catalysts being employed ceased to have sufficient activity or failed entirely to give the desired degree of hydrogenation. This was occasioned by the fact that all attempts to remake the "spent" catalyst resulted in a catalyst which had neither the activity nor the life of the original. It is desirable in this connection to have some means of regenerating or reactivating a "spent" catalyst without having to separate the noble metal from the support. Furthermore, using the smelting process as formerly required, the support material itself was completely destroyed. This destruction constitutes an added expense and should be circumvented if possible.

It is an object of this invention to recover in usable form substantially all of the noble metal of a spent supported noble metal oxide hydrogenation catalyst without having to resort to smelting the catalyst.

It is another object to regenerate a spent supported noble metal oxide hydrogenation catalyst without having to separate the noble metal from the support material.

Another object is to regenerate a spent supported noble metal oxide hydrogenation catalyst which will have substantially the same activity and life as the original supported catalyst had.

A still further object is to provide a process for the recovery in usable form of substantially all of the support material of a spent supported noble metal oxide hydrogenation catalyst.

Other objects will appear hereinafter.

These objects have been accomplished by first employing a supported noble metal oxide catalyst which comprises an inert, granular, substantially non-porous support material, the particles of which are uniformly coated with an adherent deposit of noble metal oxide. When such a catalyst has been employed for some time in accomplishing the hydrogenation of an unsaturated organic material, it loses its original activity to such an extent that its further use is no longer warranted, or it may no longer be able to give the required degree of hydrogenation. Hereinafter, a noble metal oxide catalyst in this condition will be referred to as a "spent" noble metal oxide catalyst.

In accordance with this invention, the aforesaid spent noble metal oxide catalyst, after it has been entirely freed of the material with which it has been in contact during hydrogenation, is treated in such a manner as to dissolve the noble metal. In most instances, aqua regia is the most suitable and convenient reagent to accomplish the dissolution. To the resulting mixture of support material and noble metal solution is added a quantity of an alkali metal nitrate and sufficient water for solution. The resulting solution with support material admixed is then heated at an elevated temperature to form the noble metal oxide. The resulting catalyst is treated to remove any water-soluble impurities and thereafter suitably dried. After regeneration by the processes hereinbefore described, the catalyst is ready for use with substantially the same activity and life as it had originally.

According to the preferred procedure, in accordance with my invention, I heat the spent catalyst in air at a temperature within the range of from about 50° C. to about 500° C. for between about 15 minutes and about 60 minutes prior to dissolution of the noble metal, etc. as hereinbefore described. While this step is not always required in accomplishing the regeneration of the catalyst, it is a desirable one in that it assists in accomplishing the reduction of any noble metal which may be present in the supported catalyst in other than elemental form.

Any noble metal oxide catalyst supported on an inert, granular, substantially non-porous support material may be regenerated by the methods in accordance with this invention. By a noble metal oxide catalyst as herein employed, there is contemplated a noble metal catalyst wherein the noble metal exists in the form of an oxide prior to its reduction with hydrogen before use, or prior to its use in a hydrogenation process wherein it is reduced to the noble metal.

Noble metal oxide catalysts which are supported on inert, granular, substantially non-porous supports are disclosed and claimed in my copending applications for U. S. Letters Patent, Serial No. 370,797, now Patent No. 2,331,915, dated October 19, 1943, and Serial No. 370,800, filed December 19, 1940.

In accordance with the aforesaid applications, it is stated that by a "substantially non-porous" material, the non-porosity refers to the particles individually in contradistinction to the material as a whole. Also, by a "substantially non-porous" material, there is contemplated a material of which the pores of the individual particles are small as compared with the particles themselves.

While improved results may be obtained in using any finely divided, inert, granular, substantially non-porous support material, preferably a material composed of particles having an average particle size by number less than about 10 microns in diameter is used. Optimum results are obtained with the use of a material having an average particle size by number within the range of from about 0.5 micron to about 5.0 microns in diameter. By average particle size of a certain range, it is contemplated that the material will consist substantially of particles having a size within the range given with a relatively small proportion of particles having a size without the range, in contradistinction to a material which, although the average particle size may be within the range, will consist substantially of particles without the range. Furthermore, it is contemplated that the aforesaid particles may be used in the form of aggregates as a part of the process of making the catalyst.

It is further preferred in accordance with the aforesaid applications that the support material employed consist of particles having rounded surfaces. By particles having rounded surfaces, there is contemplated the inclusion of particles whose surfaces are rounded or conchoidal, not those whose surfaces are made up of plane surfaces, such as, cleavage planes. Support materials having rounded or conchoidal surfaces may be produced from finely divided materials, the particles of which do not originally have rounded surfaces, by treatment in such a manner as to render the edged corners of the particles substantially rounded. For example, mechanical means such as grinding may be used for all materials which do not have a distinct cleavage such as quartz, beryl, zircon, etc. A ball, hammer, or burr mill may be used to advantage in producing the desired result. Sintering is distinctly advantageous in the case of vitreous materials, such as, glass, silica, etc. in producing particles with rounded surfaces.

The support materials contemplated by the aforesaid applications may comprise naturally occurring, finely divided materials such as, true tripoli, or naturally occurring minerals that ordinarily have to be reduced to a finely divided condition by means of grinding, such as, quartz, corundum, zircon, rutile, brookite, anatase, beryl, cristobalite, baddeleyite, thalenite, thorite, bromellite, chrysoberyl, tridymite, opal, etc.

The support materials may also comprise artificial, finely divided substances of the class of refractory oxides and silicates, such as, fused alumina, fused silica, fused beryllia, fused titania, fused zirconia, fused thoria, fused beryllium silicate, fused aluminum silicate, fused zirconium silicate, etc.

The support material of the aforesaid applications may also be produced from finely divided porous material, such as, diatomaceous earth by subjecting it to an alkali flux calcining treatment substantially as described in U. S. Patent 1,502,547 to R. Calvert, K. L. Dern, and G. A. Alles so as to render it substantially non-porous and to render the particle surfaces rounded.

Any supported noble metal oxide hydrogenation catalyst as hereinbefore described which has lost its original activity may be regenerated in accordance with the present invention. Such a spent catalyst, after it has been freed of the material with which it has been in contact during the hydrogenation process, is treated to dissolve the noble metal. The solvent normally to be used will be aqua regia. Aqua regia, however, cannot be employed with rhodium. With this metal, the process of fusing with an alkali acid sulfate and thereafter dissolving the products of the fusion with, for example, water, may be used. The fusion process may also be employed with palladium. The preferred method in the case of palladium, however, is to treat the catalyst with hydrochloric acid saturated with chlorine. It should be understood that the invention is not restricted to the use of any particular method of putting the noble metal in solution.

To the solution of the noble metal, with the support material admixed, will be added a quantity of an alkali metal nitrate with sufficient water for solution. Preferably, the nitrate will be employed in an amount which varies between the stoichiometric equivalent and about a 50% excess thereof. Six mols of sodium nitrate react with one mol of platinum chloride. Hence, the nitrate should be utilized in an amount between 6 and 9 mols for each mol of platinic chloride. The same applies for palladium chloride. It is important too that the minimum amount of water possible be employed in effecting the solution.

The resulting solution with support material admixed is then taken to dryness with agitation. If desired, additional support material may be added to maintain any noble metal to support ratio. The resulting material may be ground lightly and mixed thoroughly for the purpose of distributing the noble metal salts throughout the mass. In order to form the noble metal oxide, the mass is then heated at a temperature within the range of from about 450° C. to about 550° C. for a period of from about 30 minutes to about 60 minutes. Preferably, however, I heat the mass for about 40 minutes at a temperature within the range of from about 500° C. to about 550° C.

The mass is then allowed to cool and the water-soluble impurities extracted by, for example, allowing the mass to stand in distilled water for several hours and then filtering and washing with distilled water. The water may be removed by drying at a temperature preferably below 110° C. Desirably, the catalyst will be lightly crushed. It is then ready for use as such, or it may be reduced with hydrogen prior to its use in accomplishing the hydrogenation of the desired unsaturated material.

Where aqua regia is employed in accomplishing the dissolution described hereinbefore, a procedure which may be employed, if desired, is to take the resulting solution with admixed support material to dryness and thereafter redissolve the platinum using, for example, a dilute nitric acid solution. The advantage derived in such a procedure is that it insures the absence of an excess of hydrochloric acid. It will be understood, however, that this additional step need not necessarily be employed in regenerating a supported noble metal catalyst in accordance with the present invention.

When viewed through a petrographic microscope, the regenerated noble metal oxide catalysts, prepared in accordance with this invention, appear to contain the noble metal oxide essentially as single crystals firmly adhering to the surfaces of the individual particles employed as the support. It is contemplated, furthermore, that the noble metal be present in the form of either the oxide or a hydrate thereof, depending upon the temperature at which the catalyst was dried.

There follow specific examples which illustrate several ways in which the principles of the invention have been demonstrated, but they are not to be taken as being exclusive or limiting in any way. The parts and percentages, unless otherwise indicated, are by weight.

Example 1

The "spent" catalyst employed in this example was a platinum oxide catalyst supported on finely divided ground quartz. In its preparation, 1 part of metallic platinum and 12 parts of ground quartz were employed. This catalyst upon its first use in hydrogenating wood rosin in acetic acid solution had such a high activity that it produced a rosin having a saturation of 80% in 30 minutes at a temperature of 35° C. and at a pressure of 50 lbs./sq. in. using a platinum to rosin ratio of .01. In its "spent" condition this same catalyst required 60 minutes under the same conditions to hydrogenate a similar rosin to 55% saturation. This spent catalyst was washed with glacial acetic acid and thereafter dried to remove all traces of solvent. The catalyst was then heated in a muffle furnace in the presence of air at 450° C. for one hour. After the catalyst had cooled, it was treated with sufficient aqua regia (3 parts hydrochloric acid to 1 part nitric acid) at 100° C. to dissolve the platinum.

The mixture was then taken to dryness with several additions of nitric acid. 10 parts of 5% nitric acid were added to the mass to redissolve the platinum. Then, 8 parts of sodium nitrate and sufficient water to dissolve the same were added. The mixture was then taken to dryness with agitation. After light grinding, the mass was heated in a slow stream of air at 538° C. for 20 minutes and then allowed to cool to 500° C. over a 30-minute period. After cooling to 50° C. over an additional 30-minute period, the mass was stirred into 500 parts of distilled water and allowed to stand for 3 days. It was then filtered and washed with 500 parts of 5% acetic acid followed by an additional wash with 200 parts of distilled water. The catalyst was dried at 90° C. to 100° C. The catalyst was then lightly crushed and was ready for use. Upon its being employed again in the hydrogenation of wood rosin in acetic acid solution under the same conditions as formerly used, it gave a rosin having an 80% saturation in 30 minutes.

Example 2

Substantially the same procedure was employed as in Example 1 except that in the making of the original catalyst 9 parts of alkali calcined kieselguhr were used in place of 12 parts of ground quartz. The kieselguhr had an average particle size by number of 1.5 microns. This catalyst when first used in hydrogenating N wood rosin in acetic acid solution produced a rosin having a saturation of 78% in 30 minutes at a temperature of 35° C. and at a pressure of 50 lbs./sq. in. using a platinum to rosin ratio of .01. In its "spent" condition this catalyst required 60 minutes under the same conditions to hydrogenate a similar rosin to 59% saturation. The regenerated catalyst yielded a rosin of 76% saturation in 30 minutes under the same conditions, showing that it had substantially the same activity as the original.

Example 3

Substantially the same procedure was employed as in Example 1 except that in the making of the original catalyst 12 parts of true tripoli were used in place of 12 parts of ground quartz. The true tripoli had an average particle size by number of 1.5 microns. This catalyst when first used in hydrogenating N wood rosin in acetic acid solution produced a rosin having a saturation of 80% in 30 minutes at a temperature of 35° C. and at a pressure of 50 lbs./sq. in. using a platinum to rosin ratio of .01. In its "spent" condition this catalyst required 60 minutes under the same conditions to hydrogenate a similar rosin to 55% saturation. The regenerated catalyst gave a rosin of 80% saturation in 30 minutes under the same conditions, showing that it had substantially the same activity as the original.

Example 4

The "spent" catalyst employed in this example was a palladium oxide catalyst supported on finely divided true tripoli. In its preparation, 5.0 parts of metallic palladium and 22.5 parts of true tripoli were employed. This catalyst upon its first use in hydrogenating N wood rosin in acetic acid solution produced a rosin having a saturation of 54% in 30 minutes at a temperature of 35° C. and at a pressure of 50 lbs./sq. in. using a palladium to rosin ratio of .01. In its "spent" condition this same catalyst required 60 minutes under the same conditions to hydrogenate a similar rosin to 46% saturation. This spent catalyst was washed with glacial acetic acid and then dried to remove all traces of solvent. The catalyst was heated in a muffle furnace in the presence of air at 450° C. for one hour. After cooling, the mass was moistened with formic acid and heated at 100° C. to drive off any excess formic acid. This treatment with with formic acid serves to reduce any palladium oxide which may have formed during the heating of the spent catalyst. After the catalyst had cooled, it was treated with sufficient aqua regia (6 parts hydrochloric acid to 1 part nitric acid) at 100° C. to dissolve the palladium. The mixture was then taken to dryness with several additions of nitric acid. Forty parts of sodium nitrate and sufficient water to effect solution of the sodium nitrate and palladium salts were then added. The resulting mixture was taken to dryness with agitation, ground lightly, and thereafter heated for 30 minutes at 540° C. After cooling to 50° C., the catalyst was stirred into 1000 parts of distilled water, filtered, then washed with 800 parts of aqueous 5% acetic acid. The catalyst was dried at 90° C. to 100° C. After light crushing, it was ready for use. Upon its being employed again in the hydrogenation of N wood rosin in acetic acid solution under the same conditions as formerly used, it gave a rosin having a 54% saturation in 30 minutes.

Many materials may be hydrogenated using the regenerated catalysts of this invention. For example, vegetable oils, unsaturated fatty acids, olefins, aromatic hydrocarbons, derivatives of the latter, etc., may be hydrogenated using the regenerated catalysts of the invention. Materials containing the abietyl radical, for example, rosin, abietic acid, esters thereof, such as, methyl abietate, ethyl abietate, glycerol abietate, glycol abietate, etc., abietyl alcohol, rosin oil, etc.; terpenes, such as, pine oil, alpha-terpineol, alpha-terpinene, dipentene, pinene, polymerized terpenes, etc., may readily be hydrogenated by using these catalysts. In general, these catalysts may be used to hydrogenate any unsaturated organic compounds.

The methods of this invention constitute an important advance in the supported noble metal hydrogenation art. By employing these improved methods, it is possible to use one catalyst over and over again without having to separate the noble metal from the support. The regenerated catalyst, as the examples have shown, has substantially the same activity and life as the original catalysts had. Experiment has shown, in addition, that if it be desired to separate the noble metal, for example, platinum, from the support, the processes of this invention enables such a complete separation that only between about 0.025% and about 0.1% of the platinum is left on the support and cannot be removed by any process other than that of smelting. The prior art methods for the removal of noble metal from supported catalysts left up to 10% and even more platinum remaining in the support.

The advantages of the improved processes of the invention have been demonstrated in several ways. The regenerated catalysts of the invention have been shown to have substantially the same activity and life as they originally had. Inasmuch as the decrease in the activity of noble metal catalysts is caused by the accumulation on the catalytic surfaces of poisons, such as, sulfur, lead, arsenic, selenium, tellurium, etc., the extent to which these materials are removed during the process of regeneration of the catalyst was investigated. A particular spent platinum oxide catalyst supported on alkali calcined kieselguhr and containing 30 parts per million of lead was remade according to the processes of the invention. After remaking, the lead present was less than 2 parts per million. This was such a small amount that it had not noticeable effect on the regenerated catalyst which had substantially the same activity and life which it originally had. These results show that the regeneration processes of this invention are so drastic that substantially all of the catalyst poisons are removed.

The term "noble metal" as used in the specification and claims refers to a metal of the group consisting of platinum, palladium, iridium, ruthenium, osmium, and rhodium.

Wherever in this specification and claims use is made of the term "average particle size," an average by number is thereby contemplated.

Wherever in this specification and claims, the saturation of rosin is referred to, the value given is based on a rosin composed entirely of abietic acid having a molecular weight of 302 and two double bonds per molecule.

It will be understood that the details and examples hereinbefore set forth are illustrative only, and that the invention as broadly described and claimed is in no way limited thereby.

This application is a continuation-in-part of my application, Serial No. 370,797, filed December 19, 1940, and entitled "Hydrogenation catalyst."

What I claim and desire to protect by Letters Patent is:

1. The process for regenerating a "spent" noble metal oxide hydrogenation catalyst, supported on an inert, granular, substantially non-porous support material, which process comprises heating the "spent" catalyst at a temperature within the range of from about 50° C. to about 500° C. for a period of from about 15 minutes to about 60 minutes, dissolving the noble metal by treatment of the catalyst with a solvent for the noble metal, adding an alkali metal nitrate and water, heating the mixture at a temperature within the range of from about 450° C. to about 550° C. to form a noble metal oxide, and extracting water-soluble impurities from the product.

2. The process for regenerating a "spent" noble metal oxide hydrogenation catalyst, supported on an inert, granular, substantially non-porous support material, the particles of which have an average size by number less than 10 microns in diameter, which process comprises heating the "spent" catalyst at a temperature within the range of from about 50° C. to about 500° C. for a period of from about 15 minutes to about 60 minutes, dissolving the noble metal by treatment of the catalyst with a solvent for the noble metal, adding an alkali metal nitrate and water, heating the mixture at a temperature within the range of from about 450° C. to about 550° C. to form a noble metal oxide, and extracting water-soluble impurities from the product.

3. The process for regenerating a "spent" noble metal oxide hydrogenation catalyst, supported on an inert, granular, substantially non-porous support material, the particles of which have rounded edges and an average particle size by number within the range of from about 5.0 to about 0.5 microns in diameter, which process comprises heating the "spent" catalyst at a temperature within the range of from about 50° C. to about 500° C. for a period of from about 15 minutes to about 60 minutes, dissolving the noble metal by treatment of the catalyst with a solvent for the noble metal, adding an alkali metal nitrate and water, heating the mixture at a temperature within the range of from about 450° C. to about 550° C. to form a noble metal oxide, and extracting water-soluble impurities from the product.

4. The process for regenerating a "spent" platinum oxide hydrogenation catalyst, supported on an inert, granular, substantially non-porous support material, the particles of which have rounded surfaces and an average particle size by number within the range of from about 5.0 to about 0.5 microns in diameter, which process comprises heating the "spent" catalyst at a temperature within the range of from about 50° C. to about 500° C. for a period of from about 15 minutes to about 60 minutes, dissolving the platinum by treatment of the catalyst with a solvent for the platinum, adding an alkali metal nitrate and water, heating the mixture at a temperature within the range of from about 450° C. to about 550° C. to form platinum oxide, and extracting water-soluble impurities from the product.

5. The process for regenerating a "spent" palladium oxide hydrogenation catalyst, supported on an inert, granular, substantially non-porous support material, the particles of which have rounded surfaces and an average particle size by number within the range of from about 5.0 to about 0.5 microns in diameter, which process comprises heating the "spent" catalyst at a temperature within the range of from about 50° C. to about 500° C. for a period of from about 15 minutes to about 60 minutes, dissolving the palladium by treatment of the catalyst with a solvent for the palladium, adding an alkali metal nitrate and water, heating the mixture at a temperature within the range of from about 450° C. to about 550° C. to form palladium oxide, and extracting water-soluble impurities from the product.

6. The process for regenerating a "spent" platinum oxide hydrogenation catalyst, supported on substantially non-porous kieselguhr, the particles of which have rounded edges and an average particle size by number within the range of from about 5.0 to about 0.5 microns in diameter, which process comprises heating the "spent" catalyst at a temperature within the range of from about 50° C. to about 500° C. for a period of from about 15 minutes to about 60 minutes, dissolving the platinum by treatment of the catalyst with aqua regia, adding an alkali metal nitrate and water, heating the mixture at a temperature within the range of from about 450° C. to about 550° C. to form platinum oxide, and extracting water-soluble impurities from the product.

7. The process for regenerating a "spent" platinum oxide hydrogenation catalyst, supported on substantially non-porous quartz, the particles of which have rounded edges and an average particle size by number within the range of from about 5.0 to about 0.5 microns in diameter, which process comprises heating the "spent" catalyst at a temperature within the range of from about 50° C. to about 500° C. for a period of from about 15 minutes to about 60 minutes, dissolving the platinum by treatment of the catalyst with aqua regia, adding an alkali metal nitrate and water, heating the mixture at a temperature within the range of from about 450° C. to about 550° C. to form platinum oxide, and extracting water-soluble impurities from the product.

8. The process for regenerating a "spent" palladium oxide hydrogenation catalyst, supported on substantially non-porous kieselguhr, the particles of which have rounded edges and an average particle size by number within the range of from about 5.0 to about 0.5 microns in diameter, which process comprises heating the "spent" catalyst at a temperature within the range of from about 50° C. to about 500° C. for a period of from about 15 minutes to about 60 minutes, dissolving the palladium by treatment of the catalyst with aqua regia, adding an alkali metal nitrate and water, heating the mixture at a temperature within the range of from about 450° C. to about 550° C. to form palladium oxide, and extracting water-soluble impurities from the product.

9. The process for regenerating a "spent" platinum oxide hydrogenation catalyst, supported on substantially non-porous kieselguhr, the particles of which have rounded edges and an average particle size by number within the range of from about 5.0 to about 0.5 microns in diameter, which process comprises heating the "spent" catalyst at a temperature within the range of from about 50° C. to about 500° C. for a period of from about 15 minutes to about 60 minutes, dissolving the platinum by treatment of the catalyst with aqua regia, adding an alkali metal nitrate and water, heating the mixture at a temperature within the range of from about 500° C. to about 550° C. to form platinum oxide, and extracting water-soluble impurities from the product.

10. The process for regenerating a "spent" platinum oxide hydrogenation catalyst, supported on substantially non-porous quartz, the particles of which have rounded edges and an average particle size by number within the range of from about 5.0 to about 0.5 microns in diameter, which process comprises heating the "spent" catalyst at a temperature within the range of from about 50° C. to about 500° C. for a period of from about 15 minutes to about 60 minutes, dissolving the platinum by treatment of the catalyst with aqua regia, adding an alkali metal nitrate and water, heating the mixture at a temperature within the range of from about 500° C. to about 550° C. to form platinum oxide, and extracting water-soluble impurities from the product.

11. The process for regenerating a "spent" palladium oxide hydrogenation catalyst, supported on substantially non-porous kieselguhr, the particles of which have rounded edges and an average particle size by number within the range of from about 5.0 to about 0.5 microns in diameter, which process comprises heating the "spent" catalyst at a temperature within the range of from about 50° C. to about 500° C. for a period of from about 15 minutes to about 60 minutes, dissolving the palladium by treatment of the catalyst with aqua regia, adding an alkali metal nitrate and water, heating the mixture at a temperature within the range of from about 500° C. to about 550° C. to form palladium oxide, and extracting water-soluble impurities from the product.

12. The process for regenerating a "spent" noble metal oxide hydrogenation catalyst, supported on an inert, granular, substantially non-porous support material, the particles of which have rounded edges and an average particle size by number within the range of from about 5.0 to about 0.5 microns in diameter, which process comprises heating the "spent" catalyst at a temperature within the range of from about 50° C. to about 500° C. for a period of from about 15 minutes to about 60 minutes, dissolving the noble metal by treatment of the catalyst with a suitable solvent, adding an alkali metal nitrate and water, heating the mixture at a temperature within the range of from about 500° C. to about 550° C. to form a noble metal oxide, and extracting water-soluble impurities from the product.

WILLIAM J. KIRKPATRICK.